(12) United States Patent
Baumann et al.

(10) Patent No.: US 6,402,960 B1
(45) Date of Patent: Jun. 11, 2002

(54) THIACROWN POLYMERS FOR REMOVAL OF MERCURY FROM WASTE STREAMS

(75) Inventors: Theodore F. Baumann, Tracy; John G. Reynolds, San Ramon; Glenn A. Fox, Livermore, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/513,549

(22) Filed: Feb. 25, 2000

Related U.S. Application Data

(60) Provisional application No. 60/122,133, filed on Mar. 1, 1999.

(51) Int. Cl.⁷ .................................................. C02F 1/56
(52) U.S. Cl. ........................ 210/670; 210/702; 210/914
(58) Field of Search ................................ 210/678, 914, 210/912, 702

(56) References Cited

U.S. PATENT DOCUMENTS 6,147,225 A * 11/2000 Gaboury 6,187,227 B1 * 2/2001 Minevski et al. ........... 208/207

FOREIGN PATENT DOCUMENTS

JP           5-294958 A  * 11/1993   ............. C02F/1/28
WO        WO 99 62898 A    12/1999

OTHER PUBLICATIONS

T.F. Baumann: "Polymer pendant crown thioethers: synthesis and Hg extraction studies of a novel thiacrown polymer," Chem. Commun., No. 16, 1998, pp. 1637–1638, XP002142528.

* cited by examiner

*Primary Examiner*—Chester T. Barry
(74) *Attorney, Agent, or Firm*—Alan H. Thompson

(57) ABSTRACT

Thiacrown polymers immobilized to a polystyrene-divinylbenzene matrix react with $Hg^{2+}$ under a variety of conditions to efficiently and selectively remove $Hg^{2+}$ ions from acidic aqueous solutions, even in the presence of a variety of other metal ions. The mercury can be recovered and the polymer regenerated. This mercury removal method has utility in the treatment of industrial wastewater, where a selective and cost-effective removal process is required.

11 Claims, 1 Drawing Sheet

THIACROWN POLYMERS FOR REMOVAL OF MERCURY FROM WASTE STREAMS

CROSS-REFERENCE TO RELATED APPLICATIONS

This application claims the benefit of U.S. Provisional Application No. 60/122,133, filed Mar. 1, 1999, entitled "Thiacrown Polymers for Removal of Mercury from Waste Streams", which is incorporated herein by this reference.

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates to polymeric sulfur compounds, particularly for use in a process of extraction of mercury from aqueous waste streams.

2. Description of Related Art

Due to increased environmental concerns about waste remediation, major efforts are underway to design new materials that can effectively remove and recover toxic metal ions from aqueous solutions. One approach to this problem has been to use organic ligands anchored to solid supports. Such a strategy presents several advantages in the treatment of aqueous waste. First, specific binding properties of the ligands can be exploited to selectively remove a desired metal ion from a complex solution of cations. These materials can also be recycled and reused to make the treatment process cost effective. In addition, this technique can potentially minimize the amount of secondary waste generated in the extraction process, a major challenge in waste treatment. The utility of polymer pendant ligands for the extraction of a variety of metal ions from aqueous media has been previously investigated.

Removal, immobilization, and characterization of mercury in waste streams, such as those generated at U.S. Department of Energy facilities, are a major remediation objective. These waste streams can contain high levels of mercury and include aqueous and non-aqueous sludges, absorbed liquids, and partially or fully stabilized sludges. These streams require the removal and immobilization of mercury to effectively meet environmental criteria for disposal. Removal of mercury ions, in particular, requires a robust and selective sequestering agent, since such waste streams typically are not only very acidic, but also contain a wide variety of other heavy metal ions, such as $Al^{3+}$, $Fe^{3+}$ and $Pb^{2+}$. Thus, there is a need to develop polymeric extractants for heavy metal ion remediation in mixed waste streams. The present invention provides an effective method for mercury removal, particularly selective mercury removal, from acidic waste streams.

SUMMARY OF THE INVENTION

The present invention is a method to remove heavy metal cations, particularly mercury, directly from acidic aqueous waste streams using a novel composition having pendant crown thioethers (thiacrowns) attached to polymer supports. These thiacrown ligands or polymers are well-suited for extracting mercury due to the high affinity that sulfur crowns have for the Hg(II) ion, and they are robust enough to hold up to the acidic conditions of the mixed waste streams.

A novel series of thiacrowns can be synthesized by a method of the invention wherein hydroxyalkyl group (e.g., hydroxymethyl) pendant arms are incorporated into a thiacrown precursor, the precursor is cyclized to form the thiacrown, the hydroxyalkyl group of the pendant arms is converted to nitrogen-containing group (e.g., amino group), and the resulting macrocycles are allowed to be attached to polymer supports (via the nitrogen-containing pendant arms) to form "thiacrown polymer compositions" that have exhibited highly effective mercury extraction from the aqueous waste streams. The thiacrown polymers are synthesized by making acyclic thiacrown precursors containing a side chain (e.g., pendant) moiety that is unreactive during the cyclization (i.e., ring closure) step, but can then be functionalized (for attachment to the polymer) following the ring closure. The crown precursors can contain both sulfur and oxygen heteroatoms and the resultant thiacrowns typically contain from 3 to 6 sulfur atoms.

Such a mercury removal method is effective in the treatment of industrial wastewater, especially in mixed waste streams containing additional metal ions such as iron, cadimium, lead and aluminium where a selective process for removing mercury is required. An example of the utility of the process of the invention is at the Idaho National Engineering Laboratory, which produces and disposes of submarine reactor fuel rods. In the disposal process of these fuel rods, mercury is added in catalytic amounts to an acidic aqueous waste stream, which results in levels of mercury of 100 ppm or more. To dispose of the waste properly, the mercury levels must be reduced. A large volume (millions of gallons), a corrosive nature of the waste stream, as well as a competitive binding of other metal ions in the waste, combine to pose a complex remediation problem. The thiacrown polymer composition of the present invention has the extraction capability to remove mercury from these acidic fuel reprocessing waste streams.

Other advantages of the present invention will become apparent from the following description and accompanying drawings.

BRIEF DESCRIPTION OF THE DRAWINGS

The accompanying drawings, which are incorporated into and form part of this disclosure, illustrate embodiments of the invention and together with the description, serve to explain the principles of the invention.

DETAILED DESCRIPTION OF THE INVENTION

Figure 1:
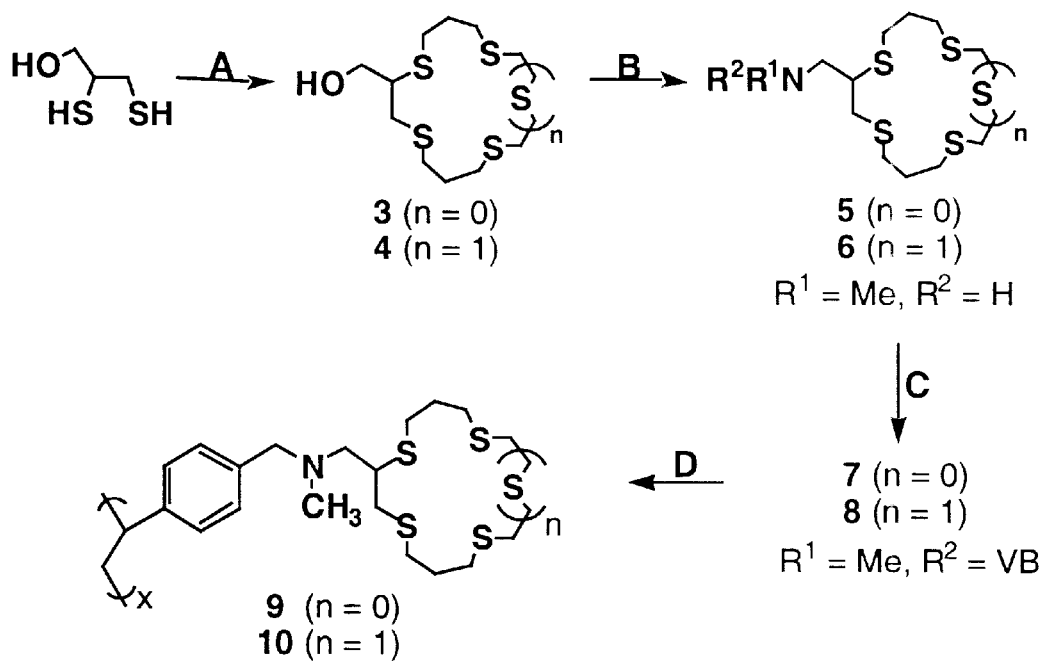
FIG. 1 shows the synthesis scheme of thiacrown polymers, including a thiacrown polymer for removing mercury from waste streams.

The present invention is a method of removing metal cations such as those of silver, lead, cadium, and particularly mercury, directly from aqueous waste streams using pendant crown thioethers (know herein as thiacrowns) attached to solid polymer supports, even in the presence of other metal ions, such as $Cd^{2+}$, $Al^{3+}$, $Fe^{3+}$, and $Pb^{2+}$. The thiacrowns are well-suited for selective removal of $Hg^{2+}$ due to their high affinity for this ion, as well as their resistance to degradation under acidic conditions, and particularly in aqueous solutions having a pH less than 3.0. Pendant arm thiacrowns are synthesized and incorporated into a polymer, such as a polystyrene-divinylbenzene co-polymer matrix. As describe hereinafter, extraction experiments employing the thiacrown polymer demonstrate its effectiveness and selectivity for the removal of the $Hg^{2+}$ion from acidic aqueous media.

General Synthesis of Thiacrown Polymers

The preparation of the thiacrown polymers initially involves the synthesis of sulfur crowns containing one or more pendant arm moieties incorporated into the carbon framework (i.e., bonding to carbon atoms) of the thiacrown. The pendant moieties can have as little as one carbon atom, and generally are initially derived from hydroxyalkyl groups (including straight and/or branched-chain species), such as hydroxyethyl and hydroxymethyl groups, with the latter being most preferred. The thiacrowns usually have from about three to about six sulfur atoms among the two and/or three carbon sequences of the enclosed rings, with thiacrowns having 4 or 5 sulfur atoms being preferred. Examples of particularly useful resulting thiacrowns include [11]ane-$S_3$ to [20]ane-$S_6$. The oxygen-containing pendant moieties can be converted to the nitrogen-containing groups (e.g., amino groups), usually with relatively low molecular weight amines such as methlyamine, although any amine may be utilized that does not hinder the subsequent formation of an effective thiacrown/polymer composition. The nitrogen-containing pendant arm, preferably containing amine linkage, can then be used to attach or anchor the thiacrown directly to a chemically modified polymer support or, alternatively, the pendant arm linkage can be functionalized to form a thiacrown monomer that can be polymerized to generate a co-polymer matrix. In either case, the pendant arm thiacrown is attached to a polymer in such a manner as to be immobilized on the polymer.

While syntheses for C-substituted sulfur crowns have been previously employed, such methods are not preferred for the purposes of the invention. An acyclic thiacrown precursor containing a pendant moiety is required in the invention so that, following the cyclization reaction, the moiety can be chemically modified to include a reactive group, as by being converted to an amino group, to allow for the attachment of the reactive group on the pendant arm of the thiacrown to a variety of polymeric supports, i.e., polystryrene polymers, polyethylene polymers, methacrylate polymers, resins, or even silica supports. Although the thiacrown precursor contains an unreactive group in the pendant moiety prior to formation of the thiacrown, the unreactive group on the pendant arm of the formed thiacrown, such as the hydroxyalkyl group, can then be readily converted to a reactive group, such as a nitrogen-containing moiety (e.g., amino group), and the resultant thiacrown/nitrogen-containing pendant composition can then attach to the polymer or be converted to a monomer capable of polymerization. (As used herein, an "unreactive" group is not capable of reacting with the ring components during the conversion of the thiacrown precursor to the thiacrown, i.e., during formation of the ring on the thiacrown.) For example, the commercially available 2,3-dimercapto-1-propanol has been selected as the acyclic precursor with the expectation that an unreactive pendant arm alcohol moiety can be readily converted to a pendant arm amino group (capable of forming amine linkage), thus allowing for more flexibility in attaching the thiacrown to a receptive polymer substrate or being co-polymerized to form part of a polystyrene-divinylbenzene matrix.

The preparation of the thiacrowns containing the oxygen-containing pendant arms, such as an alcohol-containing pendant arm, is illustrated in step A of FIG. 1. (In FIG. 1, n=the number of sulfur atoms in the thiacrown ring above 4) For example, hydroxymethyl crown thioethers, 2-hydroxymethyl-1,4,8,11-tetrathiacyclotetradecane ([14]ane$S_4$-OH),n=0, and 2-hydroxymethyl-1,4,8,11,14-pentathiacycloheptadecane ([17]ane$S_5$-OH),n=1 are synthesized in ~25% yield through reaction of 2,3-dimercapto-1-propanol with their respective α,ω-ditosylthiaalkanes in N,N-dimethylformamide as shown in the step A in FIG. 1, using, for example, the cesium carbonate mediated cyclization method introduced by Kellogg and co-workers (see Buter and Kellogg, *Org. Synth.*, 1987, vol. 65, p.150), the method which is incorporated by reference herein in its entirety. These crowns are purified using column chromatography.

The conversion of the thiacrowns containing the oxygen-containing pendant arms to the thiacrowns containing the reactive nitrogen-containing pendant arm(s) is illustrated in step B of FIG. 1. For example, N-(methyl) arninomethylthiacrowns, 2-(N-methyl)aminomethyl-1,4,8,11-tetrathiacyclotetradecane ([14]ane$S_4$-NMe),n=0, and 2-(N-methyl)-aminomethyl-1,4,8,11,14-pentathiacycloheptadecane ([17]ane$S_5$-NMe),n=1, can be prepared in ~65% yield through treatment of the hydroxymethylthiacrowns with thionyl chloride to form the 2-chloromethylthiacrowns, followed by reaction with monomethylamine.

The nitrogen-containing pendant arm of the thiacrown can be attached to any polymer capable of bonding with the reactive pendant arm so as to immobilize the thiacrown, particularly in acidic aqueous solution. Preferably, such a thiacrown containing the nitrogen-containing pendant arm can be attached by first being converted to a polymer precursor such as a monomer that can then be polymerized or co-polymerized (so as to immobilize the thiacrown). For example, synthesis of the polymer precursor 4-vinylbenzyl-substituted thiacrown N-(4-vinylbenzyl)-N-(methyl)-2 aminomethyl-1,4,8,11,14-pentathiacycloheptadecane (80%) is readily accomplished (as illustrated in step C of FIG. 1)by treatment of 2-(N-methyl)aminomethyl-1,4,8,11,14-pentathiacycloheptadecane with 4-vinylbenzyl chloride. Functionalization of ligands with the vinylbenzyl group has been demonstrated as a convenient way to incorporate ligands into a polystyrene matrix. The styrene-like monomer can then be easily polymerized using a radical initiator. The [17]ane$S_5$ crowns are a preferred species and selected for the polymerization reaction since $S_5$ crowns have a tendency to form 1:1 metal:ligand complexes with the $Hg^{2+}$ion.

Copolymerization of the 4-vinylbenzyl-substituted thiacrown N-(4-vinylbenzyl)-N-(methyl)-2 aminomethyl-1,4,8,11,14-pentathiacycloheptadecane with DVB (80% divinylbenzene) in methanol using AIBN as the radical initiator generates a highly cross-linked macroporous polymer 10 as shown in step D in FIG. 1. The exemplary thiacrown polymer 10, when 5 sulfur atoms are included in the ring of the thiacrown, i.e. n=0, is isolated as a white powder that is insoluble in both organic and aqueous media. The fact that the polymer is insoluble in $H_2O$ is important because the polymer can be easily separated from aqueous solution once the $Hg^{2+}$ extraction is complete. Elemental analysis of the resulting polymeric material shows that each gram of the polymer contains 1.53 mmol of [17]ane$S_5$ crown (based on % weight of sulfur).

To ascertain the $Hg^{2+}$ binding capacity of the polymer, polymer 10 can be treated with a large excess of $Hg^{2+}$ at pH 1.5. It has been determined that the polymer has ~0.5 mmol of $Hg^{2+}$ binding sites per gram resin. Assuming that each $Hg^{2+}$ ion complexes with a single crown, that number suggests that only 30% of the thiacrowns are involved in $Hg^{2+}$ extraction. This number is probably higher, however, since there may be cooperative binding of the $Hg^{2+}$ ions, meaning that sulfur donors from two or more crowns may be involved in binding a single $Hg^{2+}$ ion.

Detailed Synthesis of Thiacrown-containing Polymers

Specific examples of preparing the compositions used in the invention are set forth hereinafter. 4,7-dithiadecane-1,10-diol and 4,7-dithiadecane-1,10-di-p-toluenesulfonate, i.e., thiacrown precursors containing a pendant, are prepared according to conventional procedures. Standards of 1000 and 10,000 ppm metal ion solutions ($Al^{3+}$, $Fe^{3+}$, $Pb^{2+}$, $Cd^{2+}$) in 2 to 5% nitric acid (guaranteed ±3 ppm) are purchased from commercial sources. All other reagents and solvents are of reagent grade quality and used as received.

The synthesis of 4,7,10-trithiatridecane-1,13-diol is performed by the following method. Sodium metal (3.1 g, 0.136 m) is slowly added in small pieces to ethanol (150 mL). After all of the sodium has undergone reaction, 2-mercaptoethyl sulfide (10 g, 0.065 m) is added under nitrogen with stirring. The resulting solution is brought to reflux and 3-chloro-1-propanol (12.85 g, 0.136 m) is added dropwise. The reaction is kept at reflux for an additional two hours, cooled, and the white precipitate is collected by filtration. The precipitate is then dissolved in hot acetone (300 mL), and the suspension is filtered to remove NaCl. Slow cooling of the acetone solution produces white needles that are collected by filtration (15 g, 85 %).

The synthesis of 4,7,10-trithiatridecane-1,13-di-p-toluenesulfonate is performed by the following method. A solution of previously synthesized 4,7,10-trithiatridecane-1,13-diol (7.5 g, 0.028 m) and triethylamine (8.8 mL, 6.2 g, 0.061 m) in $CH_2Cl_2$ (100 mL) is cooled to 0° C. with stirring and p-toluenesulfonyl chloride (11.6 g, 0.061 m) is added dropwise over 0.5 hour. The reaction is stirred at 0° C. for an additional six hours and is then placed in the freezer overnight. The reaction is then poured over crushed ice in concentrated HCl (100 mL) and stirred for 30 minutes. The organic phase is collected, dried ($MgSO_4$), and filtered. The chloroform is removed by rotary evaporation to yield a light yellow oil. The product is isolated as a white crystalline solid after recrystallization from hot methanol (12.2 g, 75%).

The synthesis of 2-hydroxymethyl-1,4,8,11-tetrathiacyclotetradecane 3 (as shown in step A of FIG. 1) is performed by the following method. Finely powdered anhydrous cesium carbonate (10.3 g, 0.032 m) is suspended in N,N-dimethylformamide (200 mL) under a nitrogen atmosphere and the reaction is heated to 90° C. The suspension is vigorously stirred as a solution is added of 2,3-dimercapto-1-propanol (2.6 g, 0.021 m) and 4,7-dithiadecane-1,10-di-p-toluenesulfonate (10.8 g, 0.021 m) in DMF (75 mL) from a dropping funnel over a 12 hour period. After this addition is complete, the reaction is stirred for an additional 12 hours, after which the solvent is removed in vacuo. The reaction residue is taken up in $CHCl_3$ (200 mL) and filtered. The filtrate is washed three times with water (100 mL), dried ($Na_2SO_4$), filtered, and the $CHCl_3$ is removed, resulting in a gold oil. The product is purified by column chromatography on silica gel (eluent: 2% methanol in $CHCl_3$) and is isolated as a white crystalline product (1.8 g, 29 %).

The synthesis of 2-hydroxymethyl-1,4,8,11,14 pentathiacycloheptadecane 4 (as shown in step A of FIG. 1) is performed by the following method. 2,3-Dimercapto-1-propanol (2.6 g, 0.021 m) is allowed to react with previously synthesized 4,7,10-trithiatridecane-1,13-di-p-toluenesulfonate (12.2 g, 0.021 m) under conditions identical to those described above for 2-hydroxymethyl-1,4,8,11-tetrathiacyclotetradecane. The product is purified by column chromatography on silica gel (eluent: 2% methanol in $CHCl_3$) and is isolated as a waxy white solid (1.7 g, 23 %).

The synthesis of 2-(N-methyl)aminomethyl-1,4,8,11-tetrathiacyclotetradecane 5 (as shown in step B of FIG. 1) is performed by the following method. (In FIG. 1, R1 can be methyl (Me) and R2 can be hydrogen (H).) A solution of the previously synthesized crown 2-hydroxymethyl-1,4,8,11-tetrathiacyclotetradecane (0.8 g, 2.7 mmol) in $CH_2Cl_2$ (10 mL) is added dropwise to a solution of $SOCl_2$ (0.64 g, 5.4 mmol) in $CH_2Cl_2$ (10 mL). After stirring for six hours, the reaction is treated with methanol (1 mL) to quench the excess $SOCl_2$. The solvent is removed by rotary evaporation to yield 2-chloromethyl-1,4,8,11,14-pentathiacycloheptadecane as a yellow oil. The oil is then dissolved in $CH_3CN$ (15 mL) and added dropwise to $CH_3CN$ (50 mL) that has been saturated with $CH_3NH_2$ at 0° C. and charged with $Na_2CO_3$ (0.42 g, 4 mmol). The reaction is stirred for 12 hours and then filtered. The solvent is removed by rotary evaporation to yield a yellow oil. The product is purified by column chromatography on silica gel (eluent: 5% methanol in $CHCl_3$) and is isolated as a light yellow oil (0.54 g, 65%).

The synthesis of 2-(N-methyl)aminomethyl-1,4,8,11,14-pentathiacycloheptadecane 6 (as shown in step B of FIG. 1) is performed by the following method. The previously synthesized crown 2-hydroxymethyl-1,4,8,11,14-pentathiacycloheptadecane (1.1 g, 3.1 mmol) is converted to the desired product using the procedure described above for 2-(N-methyl)aminomethyl-1,4,8,11-tetrathiacyclotetradecane. The product is purified by column chromatography on silica gel (eluent: 5% methanol in $CHCl_3$) and is isolated as a yellow oil (0.71 g, 62 %).

The attachment of a thiacrown containing the nitrogen-containing pendant arm to a polymer precursor is illustrated by example in step C of FIG. 1. (In step C of FIG. 1, R1 can be methyl (Me) and R2 can be a polymer precursor such as vinyl-benzene (VB).) The synthesis of N-(4-vinylbenzyl)-N-(methyl)-2 aminomethyl-1,4,8,11-tetrathiacyclodecadecane 7 (as shown in step C of FIG. 1) is performed by the following method. The previously synthesized crown 2-(N-methyl)aminomethyl-1,4,8,11-tetrathiacyclodecadecane (0.5 g, 1.3 mmol) is dissolved in freshly distilled $CH_3CN$(20 mL) containing $Na_2CO_3$ (0.14 g, 1.4 mmol). 4-Vinylbenzyl chloride (0.24 g, 1.6 mmol) is then added and the reaction is heated to reflux for 12 hours. The reaction is then filtered and the solvent removed by rotary evaporation. The product is purified by column chromatography on silica gel (eluent: $CHCl_3$) and isolated as a light yellow oil (0.5 g, 80%).

The synthesis of N-(4-vinylbenzyl)-N-(methyl)-2 aminomethyl-1,4,8,11,14-pentathiacycloheptadecane 8 (as shown in step C of FIG. 1) is performed by the following method. The previously synthesized crown 2-(N-methyl) aminomethyl-1,4,8,11,14-pentathiacycloheptadecane (0.5 g, 1.3 mmol) is dissolved in freshly distilled $CH_3CN$ (20 mL) containing $Na_2CO_3$ (0.14 g, 1.4 mmol). 4-Vinylbenzyl chloride (0.24 g, 1.6 mmol) is then added and the reaction is heated to reflux for 12 hours. The reaction is then filtered and the solvent removed by rotary evaporation. The product is purified by column chromatography on silica gel (eluent: $CHCl_3$) and isolated as a light yellow oil (0.5 g, 80%).

The synthesis of the thiacrown polymer 10 is performed by the following method following the scheme of step D of FIG. 1 where n=1. Previously synthesized crown from step C of FIG. 1, N-(4-vinylbenzyl)-N-(methyl)-2 aminomethyl-1,4,8,11,14-pentathiacycloheptadecane (170 mg, 0.34 mmol) and DVB (80% divinyl benzene, 45 mg, 0.26 mmol) are added to freshly distilled methanol (4 mL) in a 20 mL vial. The reaction solution is degassed for 10 minutes by bubbling nitrogen through the solution. AIBN (6 mg, 0.036 mmol) is added to the reaction, the vial is capped tightly, and the reaction is heated to 78° C. for 12 hours. The white solid that forms during the reaction is collected by filtration and washed thoroughly with hot methanol. The solid is dried under vacuum. The polymer is then finely ground with a mortar and pestle under liquid nitrogen. The fine polymer powder is then washed thoroughly with hot chloroform to remove any unreacted starting material and then washed again with hot methanol. The product is dried under vacuum to yield 0.17 g of a fine white powder. Polymer 9 is prepared in the same manner as polymer 10 where n=0 and 2 aminomethyl-1,4,8,11-tetrathiacyclodecadecane is employed.

Mercury Extraction

Specific examples of mercury extraction are set forth hereinafter. The mercury extraction capabilities of the thiacrown polymer were tested in aqueous solutions at various $Hg^{2+}$ concentrations, pH values, and reaction times. The results for these experiments are summarized in Table 1 and Table 2. Extraction of $Hg^{2+}$ by polymer 10 is >90% for each experiment, even for reaction times as short as 30 minutes.

TABLE 1

Extraction of $Hg^{2+}$ from aqueous solution by thiacrown polymer as a function of time.[a]

| Initial $Hg^{2+}$ Conc.[b], ppm | Reaction Time, h | % Extraction[c] |
|---|---|---|
| 4.3 | 18 | 98 |
| 4.3 | 3 | 95 |
| 4.3 | 1 | 95 |
| 4.3 | 0.5 | 95 |
| 34 | 0.5 | 99 |

[a]Each extraction was carried out at pH 3.6.
[b]$Hg^{2+}$ concentration was calculated from dilution of stock solutions.
[c]Extraction (%) = 100 − ([remaining $Hg^{2+}$]/[starting $Hg^{2+}$] × 100).

Polymer 10 is highly efficient in extracting $Hg^{2+}$ from aqueous solutions and is more efficient in extracting $Hg^{2+}$ from aqueous solution than prior thiacrown-containing polymers. The improved performance of the polymer can be attributed to the nature of the polymer matrix. Thiacrown polymer 10 contains a trialkylamine pendant moiety that links the crown to the polymer backbone. Under acidic conditions, the amine is protonated, forming a trialkylammonium cation, and the resin (resultant thiacrown polymer of the invention) is hydrophilic. Conventional thiacrown polymers contain an ether linkage (i.e., oxygen-containing) between the polymer and the crown, formed by the reaction of a pendant alcohol of the thiacrown with either chloromethylated polystyrene as described, for example, by M. Tomoi, O. Abe, N. Takasu and H. Kakiuchi *Makromol. Chem.* 1983, 184, 2431, or 4-vinylbenzyl chloride, as described for example, by K. Yamashita, K. Kurita, K. Ohara, K. Tamura, M. Nango and K. Tsuda *React. Funct. Polymers* 1996,31,47. Such polymers are hydrophobic relative to the thiacrown polymer composition, e.g. polymer 10, used in the invention and therefore the kinetics of their extraction process may be slowed. For instance, Yamashita and co-workers have reported a 6% extraction of $Hg^{2+}$ from water over a 2 hour period using their thiacrown polymer. The thiacrown polymers of the invention exhibit more than about 10 or 15 times the mercury extraction capabilities than that of such prior thiacrown polymers. The extraction data for polymer 10 of the invention also shows that the uptake of $Hg^{2+}$ is independent of pH and is essentially quantitative over the entire acidic pH range, and particularly over a range from 1.0 to less than 7, e.g., pH range from 1.46 to 6.12. Such results of the invention differ from those reported for other polymer-based $Hg^{2+}$ extractants. Conventional systems, which contain polymer pendant dithiocarbamate ligands, such as those described by S. Huang, K. J. Franz, E. H. Arnold, J. Devenyi and R. H. Fish *Polyhedron* 1996, 15, 4241, or dithizone ligands, such as those described by R. Shah and S. Devi *React. Funct. Polymers* 1996,31, show decreased efficiency in binding $Hg^{2+}$ below pH 3.0, whereas those of the present invention exhibit relatively high efficiency at a pH less than 3.0.

The data in Table 2 show that the uptake of $Hg^{2+}$ is independent of pH and is essentially quantitative over the pH range, 1.46 to 6.12.

TABLE 2

Extraction of $Hg^{2+}$ from aqueous solution by thiacrown polymer as a function of pH.[a]

| Initial $Hg^{2+}$ Conc.[b], ppm | Reaction Time, h | % Extraction[c] |
|---|---|---|
| 3.7 | 1.45 | 99 |
| 4.1 | 2.59 | 99 |
| 4.3 | 3.60 | 98 |
| 3.5 | 6.12 | 97 |
| 32 | 1.49 | 99 |
| 34 | 2.58 | 98 |
| 34 | 3.60 | 99 |
| 32 | 6.12 | 97 |
| 170 | 1.45 | 91 |
| 400 | 2.58 | 50 |

[a]Each extraction was stirred for 30 minutes.
[b]Approximate [$Hg^{2+}$] were calculated from dilution of stock solutions.
[c]Extraction (%) = 100 − ([remaining $Hg^{2+}$]/[starting $Hg^{2+}$] × 100).

The procedure for the extraction of mercury from an acidic aqueous solution using the thiacrown polymer product 10 is described below. Mercury (II) stock solutions were prepared by dissolving $Hg(NO_3)_2$ monohydrate (0.3444 g, 1.06 mmol) in 2M $HNO_3$ (100 mL), followed by volumetric dilution to 200 ppm and 20 ppm solutions using deionized $H_2O$. The diphenylthiocarbazone (dithizone or dtz) stock solutions were prepared by dissolving dtz (0.1285 g, 0.5 mmol) in $CHCl_3$ (50 mL) and volumetrically diluting to 1 mM and 0.1 mM solutions using $CHCl_3$. Buffers were prepared by dissolving ammonium acetate (10 g, 0.129 m) in deionized $H_2O$ (10 mL) and adding concentrated HCl to adjust the solutions to the desired pH. Mercuric dithizone $(Hg(dtz)_2)$ calibration solutions were prepared by volumetric dilution of a stock solution prepared by dissolving $Hg(dtz)_2$ (0.016 g, 0.022 mmol) in $CHCl_3$ (100 mL).

The concentration of $Hg^{2+}$ was quantitated spectrophotometrically using a diphenylthiocarbazone extraction adapted from conventional methods such as those of Charlot (See Charlot, A. G., *Colorimetric Determination of the Elements*; Elsevier, Amsterdam, 1964, p. 295), such method is incorporated by reference herein in its entirety. A typical procedure is as follows: an aqueous $Hg^{2+}$ solution is treated with $CHCl_3$ (5 mL) containing a known concentration of dtz in a separatory funnel. The phases are shaken for two minutes. The presence of $Hg^{2+}$ is immediately apparent due to a solution color change from blue to orange, indicating formation of $Hg(dtz)_2$. In $CHCl_3$, the UV/visible spectrum of dtz has maxima at 444 and 606 nm, while $Hg(dtz)_2$ has maxima at 223 and 490 nm. The optimum detection range for this method is 1.0 absorbance units, thus each solution was diluted with additional $CHCl_3$ to meet this requirement. The amount of $Hg^{2+}$ in each aqueous solution was calculated from the concentration of the $Hg(dtz)_2$ complex in the organic phase. The reliability of this method was checked at each pH and each $Hg^{2+}$ concentration used in the extraction experiments, as well as at various $H_2dtz$ to $Hg^{2+}$ ratios. The accuracy of this method was determined to be ±1 ppm.

Aqueous $Hg^{2+}$ solutions were prepared by combining aliquots of the mercury solution, buffer solution, deionized $H_2O$ and then titrating the solution with HCl to the desired pH. For example, to prepare a 40 ppm $Hg^{2+}$solution at pH 1.49, the 200 ppm $Hg^{2+}$ solution (5 mL), pH 2.47 buffer (5 mL), and deionized $H_2O$ (15 mL) were combined and concentrated HCl was added to bring the pH to 1.49. The amount of $Hg^{2+}$ in the solution was then directly measured by the dtz method described above. The approximate concentration of $Hg^{2+}$ in the solution being extracted (20 ppm, 200 ppm, and 2000 ppm working solutions were used) was calculated from dilution. The remaining solution was used for reactions with the thiacrown polymer. This preparation procedure was performed for every reagent solution.

The reagent solution (5 mL) was stirred vigorously with the thiacrown polymer (20 mg) in a small vial for the desired time. The suspension was then filtered through a cotton plug in a disposable pipette and the vial and pipette were washed with deionized $H_2O$. The reaction solution and the washings were combined and tested with the dtz method described above to calculate the amount of $Hg^{2+}$ remaining in the reaction solution. The amount of $Hg^{2+}$ bound to the polymer was determined by subtracting the amount of $Hg^{2+}$ remaining in the aqueous solution from the starting $Hg^{2+}$ concentration of the reagent solution.

To determine the role that the polystyrene matrix plays in the removal of $Hg^{2+}$, polystyrene-co-divinylbenzene (200 mg), a cross-linked polystyrene resin without appended thiacrowns was treated with an aqueous solution (pH 1.46) containing $1.54 \times 10^{-4}$ g of $Hg^{2+}$ (~40 ppm) for 30 m. After filtration of the polymer, the filtrate contained $1.27 \times 10^{-4}$ g of $Hg^{2+}$. This number translates to a 2% removal of $Hg^{2+}$ for a 20 mg sample of the polystyrene-divinylbenzene copolymer wherein no thiacrowns exist.

Metal Ion Competition

The ability to selectively remove a particular metal ion from acidic aqueous solution, in a competitive situation, is of utmost importance in designing an extractant for environmental remediation applications. The thiacrown polymers of the invention can extract any relatively heavy metal cation, such as those of silver, gold, cadmium, lead and mercury. Efficiency of $Hg^{2+}$ extraction by the compositions of the invention, e.g., polymer 10, in the presence of other metal ions is shown in Table 3.

TABLE 3

$Hg^{2+}$ ion selectivity data for thiacrown polymer.[a]

| Metal | pH | Molar Ratio ($M^{n+}/Hg^{2+}$) | % Extraction[b] |
|---|---|---|---|
| $Pb^{2+}$ | 1.40 | 5 | 98 |
| $Cd^{2+}$ | 1.51 | 5 | 97 |
| $Fe^{3+}$ | 1.53 | 10 | 98 |
| $Al^{3+}$ | 1.62 | 100 | 95 |

[a]Each extraction was stirred for 30 minutes.
[b]Extraction (%) = 100 − ([remaining $Hg^{2+}$]/[starting $Hg^{2+}$] × 100).

The metal ions ($Al^{3+}$, $Fe^{3+}$, $Cd^{2+}$ and $Pb^{2+}$) were selected because they are the major constituents of mixed waste streams from processes performed by the United States Department of Energy at INEL and the $M^{n+}:Hg^{2+}$examined closely resemble those ratios found in such waste streams. The results show that the thiacrown polymer of the invention is selective for removing $Hg^{2+}$ from acidic solutions, even with a large excess of competing metal ions. No attempt was made to determine the amount of competing metal ions also bound to the thiacrown polymer. Since thiacrowns have some affinity for both $Pb^{2+}$ and $Cd^{2+}$, small amounts of such metal ions are also usually bound to the polymer. The results show, however, that they are unable to effectively compete with $Hg^{2+}$ for binding sites on the thiacrown polymer used in the invention.

The solutions of other metal ions were prepared by volumetric dilution of 1,000 and 10,000 (±3) ppm Plasma Standards. Competition experiments were done under the conditions described above and the dithizone (dtz) extraction technique was used to determine only the amount of $Hg^{2+}$ left in solution. Minor interference from $Cd^{2+}$ and $Al^{3+}$ were observed in the UV/vis spectra of $Hg(dtz)_2$. The method, however, could still be used reliably for the quantitation of $Hg^{2+}$.

The thiacrown polymers can also be used in a method for treating aqueous solutions having a pH at or about 7, e.g., for purifying drinking water, although impure aqueous solutions initially just below are preferred target solutions.

Regeneration of the Thiacrown Polymer

Figure 2:
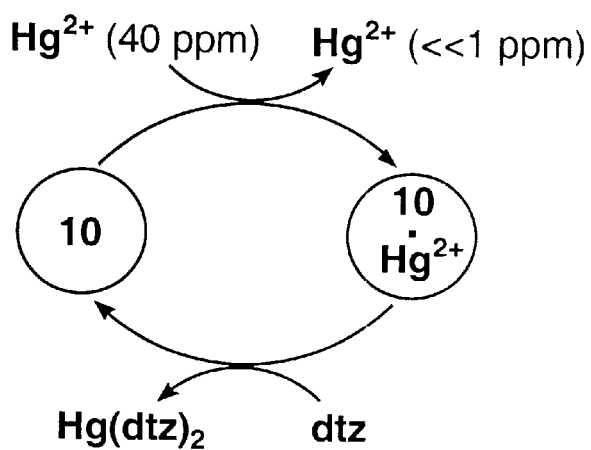
FIG. 2 shows the extraction and recovery cycle of mercury using the thiacrown polymers.

To be considered a legitimate candidate for waste remediation, the thiacrown polymers used in the invention, e.g., polymer 10, should not only exhibit selectively for the removal of $Hg^{2+}$ from acidic solution, but it should also have the capability to be reused. Regeneration of the polymer requires stripping the $Hg^{2+}$ from the binding sites of the polymer. A convenient method for the removal of $Hg^{2+}$ from the thiacrown polymer utilizes, for example, the dithizone ligand (FIG. 2) Samples of thiacrown polymer 10 loaded with $Hg^{2+}$ were treated with a chloroform solution of dtz and the polymer was separated from the orange $Hg(dtz)_2$ solution by filtration. Within the experimental error of this method, the recovery of $Hg^{2+}$ from the thiacrown polymer was determined to be quantitative. Apparently, the dithizone ligand effectively competes with the sulfur crowns immobilized on the resin for the $Hg^{2+}$ ion. Once rinsed and dried, the thiacrown polymer was used to treat another aliquot of acidic $Hg^{2+}$ solution without significant loss of capacity. Alternative methods for stripping the $Hg^{2+}$ ions from the thiacrown/pendant/polymer can be utilized.

Thiacrown/pendant/polymer 10, which had been treated with a $Hg^{2+}$ solution by the method described above, was washed with acetone (5 mL) to remove any residual $H_2O$. A 1 mM solution of dtz in $CHCl_3$ (1 mL) and $CHCl_3$ (3 mL) were added to the dried polymer. The solution color immediately turned from deep blue to orange, indicating formation of $Hg(dtz)_2$. The solution was stirred and the polymer was filtered from the $CHCl_3$ solution. This process was repeated until no further color was washed from the resin. The polymer was then dried and re-used for the $Hg^{2+}$ extraction process.

It has been demonstrated that treatment of a thiacrown polymer, such as [17]ane$S_5$ immobilized to a polystyrene-divinylbenzene matrix, with $Hg^{2+}$ under a variety of conditions efficiently removes $Hg^{2+}$ ions from acidic aqueous solutions. The extraction of $Hg^{2+}$ by the polymer was not dependent on pH and proved to be much faster than seen in other thiacrown polymer systems. The thiacrown polymer prepared by the invention is also selective for $Hg^{2+}$ over a variety of other metal ions, such as $Pb^{2+}$, $Cd^{2+}$, $Fe^{3+}$, and $Al^{3+}$. In addition, $Hg^{2+}$ recovery and polymer regeneration was demonstrated.

The foregoing description of preferred embodiments of the invention is presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated.

We claim:

1. A process for removing mercury from an aqueous stream, said method comprising:

contacting a thiacrown polymer composition comprising a thiacrown having a pendant moiety attached to a polymer by amine linkage with an aqueous stream containing Hg(II) cations.

2. The process of claim 1 further comprising removing a second aqueous stream from said aqueous stream, said second aqueous containing less HG(II) cations than contained in said aqueous stream.

3. The process of claim 1 wherein said aqueous stream contains one or more additional metal cations.

4. The process of claim 1 wherein said additional metal cations are selected from the group consisting of cations of iron, cadmium, aluminum and lead.

5. The process of claim 1 wherein said aqueous has a pH less than 3.0.

6. The process of claim 1 wherein said aqueous waste stream comprises greater than 100 ppm of said Hg(II) cations.

7. The process of claim 1 further comprising the absorption of said Hg(II) cations by said thiacrown to produce a mercury-containing thiacrown polymer composition and a regenerating process for removing said Hg(II) cations from said mercury-containing thiacrown polymer composition.

8. A process for removing metal cations from an aqueous stream, said method comprising:

contacting a thiacrown polymer composition comprising a thiacrown having a pendant moiety attached to a polymer by amine linkage with an aqueous stream containing one or more metal cations.

9. The process of claim 8 further comprising removing said metal cations from said thiacrown polymer composition after said contacting.

10. The process of claim 8 wherein said aqueous stream has a pH less than about 7.0.

11. The process of claim 8 wherein a second aqueous stream containing less metal cations than said aqueous stream is obtained after said contacting.

* * * * *